Oct. 7, 1958  V. K. ELORANTA  2,854,908
FILM MAGAZINE EMBODYING PROCESSING MEANS
Filed Oct. 27, 1954  3 Sheets-Sheet 1

INVENTOR
Vaito K. Eloranta

BY Brown and Mikulka
ATTORNEYS

Oct. 7, 1958  V. K. ELORANTA  2,854,908
FILM MAGAZINE EMBODYING PROCESSING MEANS
Filed Oct. 27, 1954  3 Sheets-Sheet 3

INVENTOR
Vaito K. Eloranta

BY Brown and Mikulka
ATTORNEYS

United States Patent Office 2,854,908
Patented Oct. 7, 1958

2,854,908
FILM MAGAZINE EMBODYING PROCESSING MEANS

Vaito K. Eloranta, Needham, Mass., assignor to Polaroid Corporation, Cambridge, Mass., a corporation of Delaware Application October 27, 1954, Serial No. 465,036

14 Claims. (Cl. 95—89)

This invention relates to photographic apparatus and more particularly to a novel magazine for processing a photographic film unit.

It is an object of the present invention to provide a simple inexpensive magazine, including means permitting daylight loading of a film unit into a magazine, means for positioning the film unit for exposure and means for processing the film unit during its withdrawal from the magazine.

Another object of the present invention is to provide a magazine of the above type comprising means providing a chamber in which a film unit including a photosensitive element, a second element, and containing means carrying a processing liquid may be positioned during exposure, pressure-applying rolls for spreading said processing liquid from said container in a layer between said photosensitive and second elements during withdrawal of the film unit from the magazine, novel means for mounting said rolls and biasing them toward one another, and means cooperating with said mounting means for selectively positioning said rolls.

A further object of the present invention is to provide a magazine of the above type including a forward plate and a rear plate secured together with a passage therebetween in which a film unit is positioned during exposure, an exposure aperture in the forward plate, a pair of pressure-applying rolls mounted within said passage on either side thereof, and novel means mounting said pressure-applying rolls on said rear plate for movement into and out of pressure-applying position.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
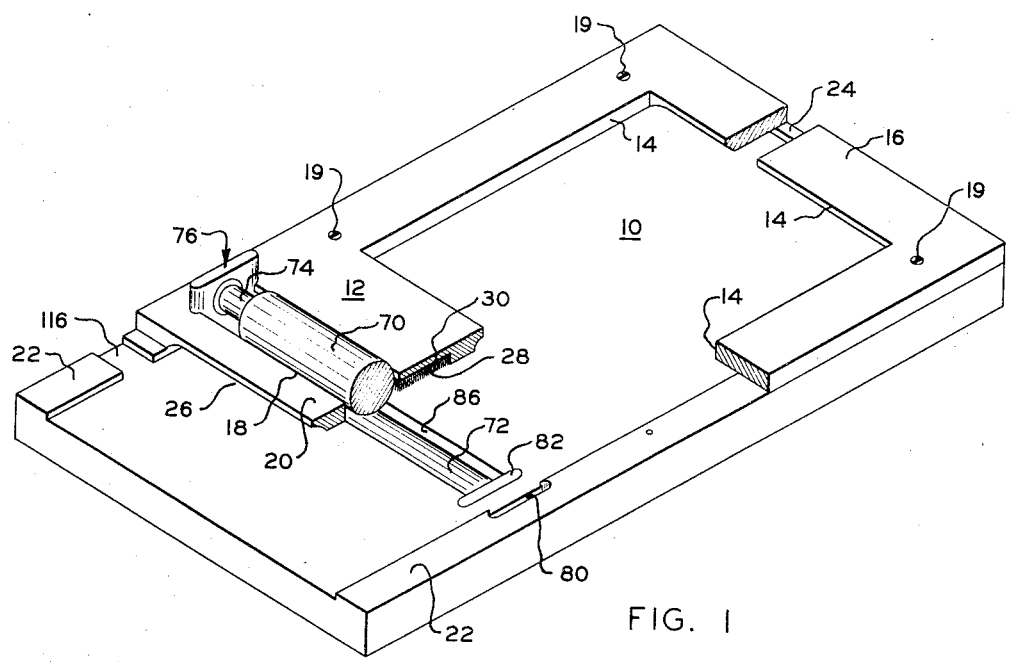
Figure 1 is a perspective view, partially in section with parts broken away, of a magazine embodying the present invention.
Figure 2:
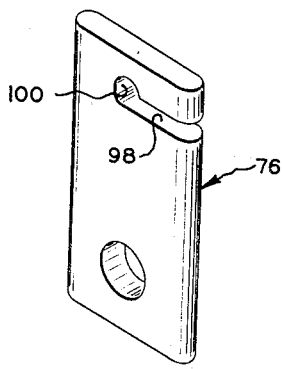
Fig. 2 is a perspective view showing in detail an element of the magazine.
Figure 3:
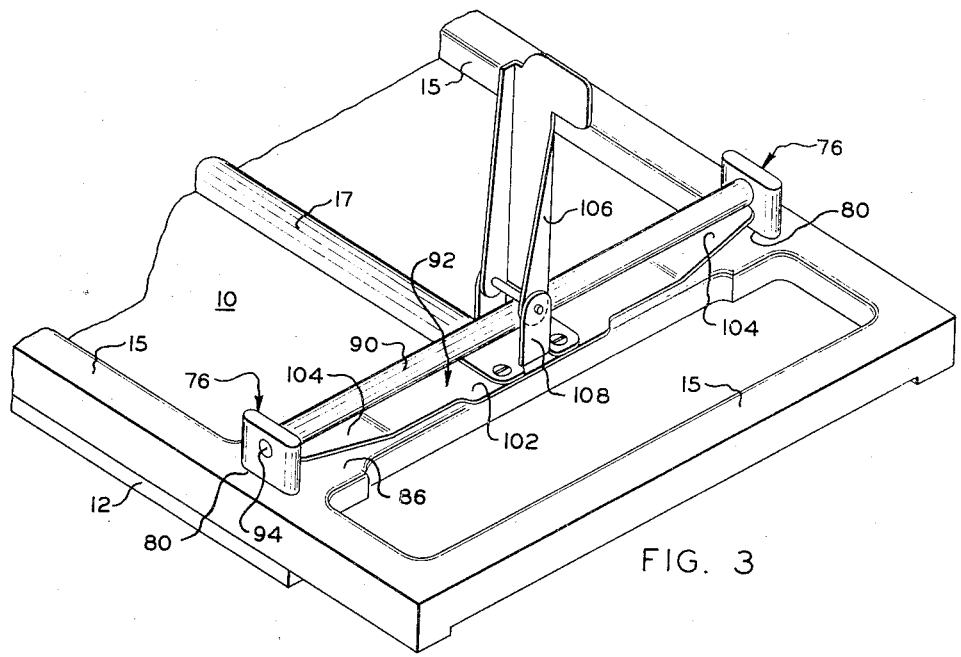
Fig. 3 is another perspective view of a portion of the magazine of Fig. 1.
Figure 4:
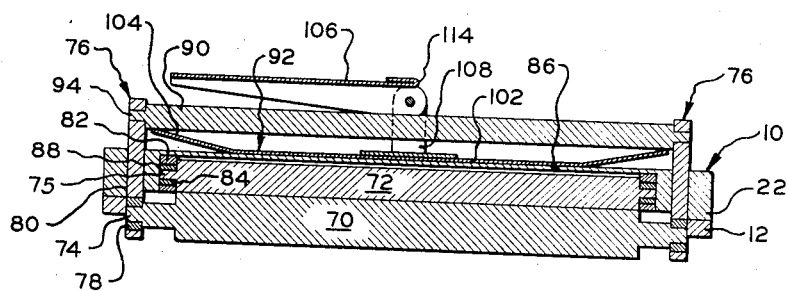
Fig. 4 is a view in section of the magazine taken along a plane through the axes of the pressure rolls.

The present invention is concerned with the provision of a novel inexpensive magazine in which the photosensitive element of a film unit may be exposed and processed. The magazine is particularly adapted to use in conjunction with a camera and comprises means for loading a film unit, including a photosensitive element, a second element, and a container carrying a processing liquid into the camera in the presence of light, means for positioning the film unit during exposure of the photosensitive element and means for processing the photosensitive element by spreading the processing liquid from the container in a thin layer between the photosensitive and second elements during withdrawal of the film unit from the magazine. While the second element, for example, may merely aid in spreading the processing composition in a uniform layer on the photosensitive element, in a preferred form of film unit it serves as an image-receptive element or support for a positive print formed by diffusion-transfer reversal. The magazine is also adapted for use in roentgenography with a film unit which includes, for example, an element sensitive to X-radiation and an intensifying screen.

The magazine comprises a pair of plates secured in face-to-face relation to provide a passage into which a film unit may be inserted, and in which the film unit is positioned during exposure. The forward of the two plates is provided with an aperture through which the photosensitive element may be exposed, while the rear plate mounts the other elements of the magazine including a pair of pressure-applying rolls between which the film unit is advanced in order to spread the processing liquid. Novel means are provided in the rear plate for mounting the pressure-applying rolls in the passage between the plates, for resiliently urging the rolls towards one another, and for positioning the rolls so that a film unit may be inserted into the magazine without application of pressure on the film unit.

In practice, the magazine is mounted, for example, at the rear of a camera in the focal plane of a camera lens, and a lighttight seal is provided between the front plate of the magazine and the walls of the camera housing. The pressure rolls are inoperatively positioned so that the film unit may be inserted between said rolls into exposure position and, following exposure of the film unit, the pressure-applying rolls are operatively positioned and the film unit is withdrawn from the magazine between said rolls spreading the processing liquid. Film units adapted for use in the herein disclosed magazine include a lighttight cover means for preventing exposure of the photosensitive element prior to loading into the magazine and after withdrawal therefrom during processing, together with means permitting exposure of the photosensitive element within the magazine.

Referring now to Figures 1 through 4 of the drawings, wherein like numerals denote like parts, there is illustrated a self-developing magazine embodying the present invention. The magazine comprises a rectangular rear plate 10 and a rectangular front plate 12 secured thereto in face-to-face relation, front plate 12 being somewhat shorter in length than rear plate 10 and having a rectangular aperture defined by edges 14 through which a film unit positioned between the plates may be exposed to actinic light. Plate 12 is substantially flat and includes a narrow elongated opening 18 extending substantially from side to side thereof, and elongated recess 30 in its inner surface extending substantially from side to side of plate 12. Rear plate 10 is substantially flat and may include shoulders 15 formed around the edges of its rear surface together with a strengthening rib 17 for adding structural rigidity and strength.

The forward surface of rear plate 10 is provided with shoulders 22 extending along its longitudinal edges and across one end 24 so as to space plate 10 away from plate 12 and provide a passage 26 between said plates in which a film unit may be exposed. Front plate 12 may be secured to rear plate 10 either permanently or removably by such means as screws 19 secured in its margins, or by corresponding flanges and grooves on front and rear plates adapted to slidably interlock. To render passage 26 lighttight when a film unit is in exposure position within the magazine, there is provided a pad 28 of a suitable material such as felt, tufted fabric and the like, secured in recess 30 in wall 12 so as to extend into passage 26 and contact the film unit to prevent the passage of light around the film unit into the magazine. Front plate 12 and/or the housing of the camera may include suitable means for preventing light from entering the camera at the point where the magazine is joined with or secured to the camera.

Figures 5, 6:
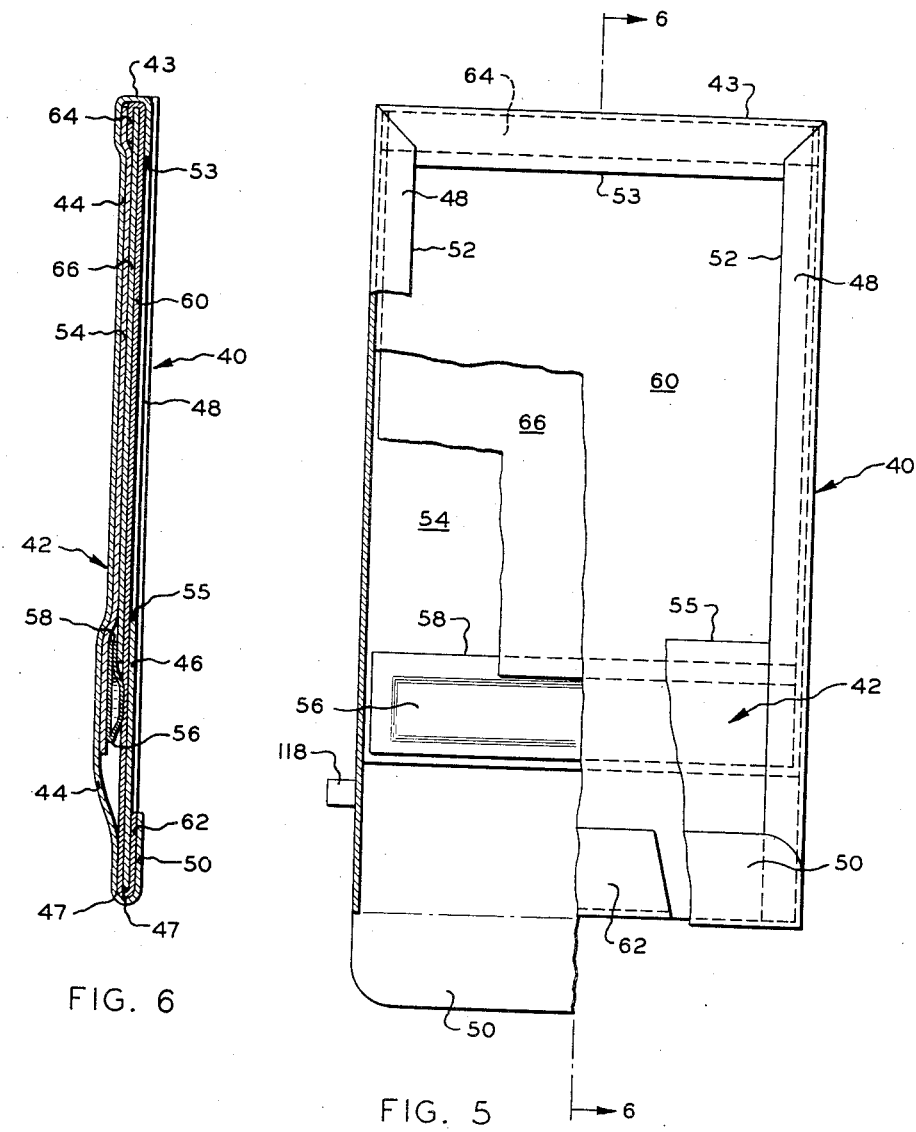
Fig. 5 is a plan view, with portions broken away, of a film unit adapted to use in the magazine of Fig. 1.
Fig. 6 is a sectional view taken along the line 6—6 of Fig. 5.

There is shown in Figs. 5 and 6 a photographic film unit 40 of the type adapted to daylight loading and processing in the herein disclosed magazine. Film unit 40 includes an outer envelope, generally indicated at 42, comprising an elongated rectangular sheet folded at 43 to provide a rear wall 44, and a front wall 46 with a passage 47 at one end. Rear wall 44 includes longitudinal edge sections 48 folded over and secured to the margins of front wall 46 and a closure flap 50 adjacent passage 47, envelope 42 being formed of any suitable, light-opaque, flexible sheet material such as black paper, metal foil or the like. Front wall 46 of envelope 42 includes a rectangular aperture defined by edges 52, 53 and 55, through which the photosensitive element of the film unit may be exposed, edges 52, 53 and 55 acting as a frame or a mask for the photosensitive element during exposure. Film unit 40 includes a rectangular photosensitive element 54 secured to the forward surface of rear wall 44 and having an area, adapted to be exposed, underlying the exposure aperture in front wall 46.

Liquid processing composition is supplied in an elongated container 56 formed of a rectangular section of vapor-, liquid-impervious sheet material folded lengthwise, sealed at its edges and filled with the processing liquid. The longitudinal edges 58 of the material comprising container 56 are sealed together so as to rupture, forming a passage through which the processing liquid is released when container 56 is subjected to compressive pressure. Container 56 is secured along a longitudinal portion of its surface opposite the liquid-releasing passage, to the end of photosensitive element 54 underlying front wall 46 of envelope 42 adjacent the aperture, edges 58 of container 56 comprising the release passage being directed toward the area of photosensitive element 54 which underlies the exposure aperture and is adapted to be exposed.

To close the exposure aperture in front wall 46 and prevent the exposure of photosensitive element 54, there is provided a rectangular closure element 60 formed of light-opaque material such as cardboard, stiff paper, or the like. Closure element 60 is slightly narrower than element 42 to permit it to slide freely between front wall 46 and rear wall 44 thereof and includes a cut and folded end flap 62 extending exteriorly of envelope 42 through passage 47. The other end portion 64 of closure element 60 is folded or turned under between said element and rear wall 44, folded end portion 64 serving a function which will appear hereinafter. A rectangular, second or image-receptive element 66 is secured to the inner surface of closure element 60 in superposition with the area of photosensitive element 54 adapted to be exposed with edge portions 58 of container 56 normally extending between photosensitive element 54 and the edge of image-receptive element 66. Flaps 50 and 62 are folded over and secured to front wall 46 to provide a lighttight closure for passage 47 while flap 62, when unfolded, provides means for grasping closure element 60 to withdraw said element from the film unit. A similar film unit for use in roentgenography may be provided without an exposure aperture in the outer envelope and a closure element therefor. Such a film unit might include, in addition to the photosensitive and second elements, a conventional intensifying screen.

Photosensitive element 54 of film unit 40 includes a layer of photosensitive material, preferably an emulsion of silver halide, in which a latent image may be attained by differential exposure to actinic light cast on a suitable support or backing. Second element 66, superposed with photosensitive element 54, is adapted to serve as a support for an image-receptive layer in which a visible print of a latent image in the photosensitive layer may be produced. An alternative construction of film unit 40, disclosed in Patent No. 2,661,293, issued December 1, 1953 to Edwin H. Land, comprises an image-receptive layer on a support and a photosensitive layer on the image-receptive layer. In this form of film unit, a separate photosensitive element is unnecessary, the image-receptive element being mounted on rear wall 44, and a container for the processing liquid being mounted between image-receptive element 66 and closure element 60 on photosensitive element 54 in position to discharge its liquid contents on the surface of the photosensitive layer adjacent the inner surface of closure element 60, the latter being formed of an opaque, light-impermeable material and serving to confine the layer of processing liquid.

The processing composition, when spread in a uniformly thin layer between photosensitive element 54 and image-receptive element 66, preferably effectuates a silver halide diffusion-transfer reversal process by which a latent image in element 54 is developed and a positive print is produced in element 66. Examples of photographic materials useful in the processes of the foregoing type are described in detail in Patent No. 2,543,181, issued to Edwin H. Land on February 27, 1951 and in Patent No. 2,647,056, issued to Edwin H. Land on July 28, 1953.

As a means for spreading a processing liquid on a photosensitive element, there is provided a pair of pressure-applying rolls 70 and 72 having cylindrical surfaces equal in length to the width of the aperture in front wall 46 of envelope 42. Each of rolls 70 and 72 is provided, respectively, with a pair of stub shafts 74 and 75, stub shafts 74 on roll 70, the forward of said rolls, being substantially longer than shafts 75 on rear roll 72. Rolls 70 and 72 are pivotally mounted with their axes in a plane and resiliently urged toward one another. Since the film unit is drawn between the rolls in order to spread the processing liquid from the container in a thin layer of predetermined thickness between photosensitive element 54 and second element 66, either or both rolls may be provided with shoulders or raised portions on their peripheries adjacent their ends. By virtue of this arrangement, clearance is provided between rolls 70 and 72 at their central portions, allowing for and controlling the thickness of the layer of the processing composition spread between the photosensitive and second elements. In another form of magazine, rolls 70 and 72 may have plane surfaces which are longer than the width of the aperture in front wall 46 of envelope 42. The end portions of roll 70 would then be supported on the longitudinal marginal portions of front wall 46 comprising edges 52. In the form of film unit adapted to use with this type of magazine, edge sections 48 do not extend to edges 52 defining the aperture in front wall 46 and the marginal portions of front wall 46 on which the ends of roll 70 are supported are equal in thickness to the layer of processing liquid.

To movably mount forward roll 70 so that it extends into passage 26 between plates 10 and 12, there are provided a pair of brackets 76 generally rectangular in shape. Each of brackets 76 includes a round opening adjacent one end in which is secured a bushing or bearing 78 in which stub shafts 74 are journaled. Rear plate 10 is provided with a pair of laterally spaced slots 80 adjacent its longitudinal edges and adapted to slidably receive brackets 76, the latter extending from the rear of the magazine through slots 80 in rear plate 10, opening 18 in front plate 12 and exteriorly of front plate 12. Forward roll 70, mounted forwardly of plate 12, extends through opening 18 into passage 26 between the plates and is movable on brackets 76 toward and away from rear plate 10.

Rear pressure roll 72 is pivotally mounted between another and substantially shorter pair of brackets 82, stub shafts 75 being journaled in bushings or bearings 84 secured in brackets 82. Roll 72 is mounted in a recess 86 in rear plate 10 so that the inner surface of plate 10 is substantially tangent to the surface of roll 72. Narrow recesses 88 are provided at the ends of recess 86 adjacent to and between slots 80 and are formed to receive brackets 82 on which roll 72 is mounted, the latter preferably being mounted permanently and not movable with respect to rear plate 10. This may be effected, for example, by making recesses 88 of such size that brackets 82 must be press-fitted into said recesses where they are retained without movement.

Means are provided for resiliently urging roll 70 toward roll 72 and for selectively positioning roll 70 away from roll 72 in order that a film unit may be inserted between the rolls without pressure being applied to the film unit. In the form shown, this means includes an elongated rod 90 secured at its ends in the end portions of brackets 76 extending rearwardly of rear plate 10 and a leaf spring 92 positioned between rear plate 10 and rod 90 so as to urge the latter away (rearwardly) from said plate. Rod 90 includes end portions 94 of somewhat smaller diameter and at which it is retained in suitable holes in brackets 76. In a preferred form, one of brackets 76 (illustrated in detail in Fig. 2) may include a slot 98 extending from one edge to a round opening 100 adapted to receive an end 94 of rod 90. By virtue of this arrangement, rod 90 may be readily disengaged from brackets 76, permitting said brackets and roll 70 mounted thereon to be removed from the magazine. Leaf spring 92 comprises a central portion 102 at which it is secured to rear plate 10 and two turned-up end portions 104 biased toward and adapted to engage rod 90 adjacent brackets 76.

To inoperatively position pressure roll 70 away from roll 72, rod 90 is moved toward plate 10 against the bias of spring 92. This is accomplished by a toggle lever 106 having a U-shaped cross section pivotally mounted on the arms of a U-shaped bracket 108 secured to plate 10 with spring 92. Toggle lever 106 pivots around pin 110 so positioned that when lever 106 is pivoted clockwise (viewing Fig. 4), a portion of arm 106, indicated at 114, engages rod 90, moving the latter toward rear plate 10 while compressing spring 92. Pivotal movement of toggle lever 106 in a counterclockwise direction releases rod 90 for movement under the bias of spring 92 in a rearward direction whereby roll 70 moves toward roll 72. By virtue of this novel construction and arrangement of mounting means, both of pressure rolls 70 and 72 are mounted on rear plate 10 together with means for selectively positioning the rolls while providing an unobstructed passage between the plates. All of the elements are readily accessible and operable from the rear of the camera and roll 70 may be readily removed for cleaning both rolls.

As a means for retaining envelope 42 of film unit 40 within passage 26 of the magazine, shoulder 22 is provided with a rectangular notch 116 adjacent the end of front plate 12. Envelope 42 includes a rectangular tab 118 extending from its edge and adapted to be detained in notch 116 to prevent movement of said film unit from exposure position between plates 10 and 12 in passage 26.

In using the magazine to expose the photosensitive element of a film unit and thereafter process it, pressure rolls 70 and 72 are first inoperatively positioned by pivoting toggle lever 106 in a clockwise direction. A film unit is inserted into the magazine through passage 26 until it comes to rest and tab 118 is engaged in notch 116. Flaps 50 and 62 are unsealed and flap 62 is grasped between the finger-tips for withdrawing closure elements 60, together with image-receptive element 66 secured thereto, from envelope 42 through passage 47. Folded end portion 64 of element 60 engages edges 58 of container 56 during withdrawal of element 60, thus preventing the complete withdrawal of the element from the film unit and any subsequent difficulty in inserting the element into the film unit. After element 60 has been withdrawn and folded end 64 has passed under edge 55 of envelope 42, the exposure opening of the film unit is unobscured and photosensitive element 54 may be exposed in the usual manner. Following exposure, closure element 60 is then reinserted into the film unit to close the exposure aperture, rendering envelope 42 lighttight and superposing image-receptive element 66 with photosensitive element 54. Pressure roll 70 is then operatively positioned by the counterclockwise movement of toggle lever 106, tab 118 is disengaged from notch 116, and the end of envelope 42, together with flaps 50 and 62, is grasped to withdraw the entire film unit from the magazine between pressure rolls 70 and 72 for spreading the processing liquid between photosensitive element 54 and image-receptive element 66. A predetermined processing period is allowed to elapse following withdrawal of the film unit from the magazine whereupon envelope 42 may be torn apart and photosensitive element 54 and image-receptive element 66 stripped apart. It is contemplated that the magazine be made of metal or molded plastic and comprise an accessory for cameras of the type adapted to use with film magazines, while the envelope and other elements of the film unit, being comprised of inexpensive materials such as paper, may be discarded after a finished positive photographic print is obtained in element 66. In addition, a magazine formed of inexpensive materials such as molded plastics may be disposed following use with film units with which it may be supplied, and while the arrangement of and structure for mounting the pressure rollers is illustrated as embodied in a magazine, it is to be understood that it may also be embodied in the structure of a camera.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for exposing and processing a photographic film unit including a photosensitive element and means containing a processing liquid, said photographic apparatus comprising, in combination, housing means comprising a forward wall and a rear wall defining a substantially shallow chamber in which said film unit may be positioned during exposure and a passage at one end of said housing means communicating with said chamber, means in said forward wall for admitting actinic radiation to said photosensitive element, means within said passage for engaging said film unit during withdrawal of said film unit from said housing means through said passage to release the liquid contents of said containing means and to spread said liquid in a layer upon said photosensitive element, said engaging means comprising a pair of substantially parallel elongated rolls mounted within said passage and extending transversely of said passage substantially from side to side thereof, an elongated slot in said forward wall extending transversely of said passage, first means rotatably mounting a first of said rolls on said rear wall so that a portion of said first roll is recessed within said slot and a portion extends into said passage, means defining an elongated recess in said rear wall of said housing means opposite said slot of said forward wall, second means rotatably mounting the second of said rolls on said rear wall substantially within said recess formed in said wall, spring means mounted on said rear wall and cooperating with said first mounting means for urging said first roll rearwardly toward said second roll, and means mounted on said rear wall and cooperating with said first mounting means for positioning said first roll forwardly away from said second roll to permit movement of a film unit through said passage between said rolls without application of pressure on said unit.

2. Photographic apparatus for exposing and processing a photographic film unit including a photosensitive element and means containing a processing liquid, said photographic apparatus comprising, in combination, housing means comprising a forward wall and a rear wall defining a substantially shallow chamber in which said film unit may be positioned during exposure and a passage at one end of said housing means communicating with said chamber, means in said forward wall for transmitting actinic radiation to said photosensitive element, means within said passage for engaging said film unit during withdrawal of said film unit from said housing means through said passage to release the liquid contents of said containing means and to spread said liquid in a layer upon said photosensitive element, said engaging means comprising a pair of substantially parallel elongated rolls mounted within said passage and extending transversely of said passage substantially from side to side thereof, first means rotatably mounting a first of said rolls at its ends and movably engaging said rear wall, said first mounting means comprising a pair of laterally spaced members extending through slots formed inwardly of said walls and slidably mounted therein, second means rotatably mounting the second of said rolls at its ends on means attached to said rear wall, said second means comprising a pair of laterally spaced members secured in recessed areas formed in said rear wall so as to be located laterally between and adjacent said first pair of mounting members, resilient means mounted on said rear wall and cooperating with said first mounting members for urging said first roll toward said second roll, and means mounted on said rear wall and cooperating with said first pair of mounting members for positioning said first roll forwardly away from said second roll to permit movement of a film unit through said passage between said rolls without application of pressure on said unit.

3. Photographic apparatus for incorporation with a camera for exposing and processing a photographic film unit including a photosensitive element, an image-receiving element and a container releasably containing a processing liquid for forming an image with said image-receiving element by a diffusion transfer reversal process, said apparatus comprising a front plate adapted to face the lens of said camera and having an aperture of given contour formed therein for admitting the actinic light of a photographic exposure to said photosensitive element, a rear plate, means located between the outer edges of said front and rear plates for spacing said plates slightly apart, said front and rear plates and spacing means providing a shallow chamber therebetween for positioning said film unit in alignment with said aperture for exposure of said photosensitive element and providing a passage adjacent one end of said chamber for inserting and removing said film unit, a pair of pressure-supplying members partially located within said passage for engaging said film unit therebetween during its withdrawal from said chamber to provide the release and spreading of said processing liquid, means for mounting said pressure-applying members to permit relative movement of their engaging surfaces toward and away from one another, said engaging surfaces lying substantially intermediate said front and rear plates in said passage, resilient biasing means mounted exteriorly of said chamber and passage on said rear plate and cooperating with said mounting means for at least one of said pressure-applying members for urging said memebr toward the other member, and manually operable means mounted exteriorly of said chamber and passage on said rear plate for urging said pressure-applying member, in opposition to said biasing means, away from said other member to permit unrestricted movement of said film unit between said members.

4. Photographic apparatus for incorporation with a camera for exposing and processing a photographic film unit including a photosensitive element, an image-receiving element and a container releasably containing a processing liquid for forming an image with said image-receiving element by a diffusion transfer reversal process, said apparatus comprising a substantially flat front plate adapted to face the lens of said camera and having an aperture of given contour formed therein for admitting the actinic light of a photographic exposure to said photosensitive element, a substantially flat rear plate, spacer means located between the outer marginal areas of said front and rear plates, said front and rear plates and spacer means being attached to one another to provide a chamber therebetween for positioning said film unit in correct relation to said aperture for exposure of said photosensitive element and providing a passage adjacent one end of said chamber for inserting and removing said film unit, a pair of pressure-applying members partially located within said passage for engaging said film unit therebetween during its withdrawal from said chamber to provide the release and spreading of said processing liquid, means extending substantially at 90° relative to the principal flat surfaces of said plates for mounting said pressure-applying members to permit relative movement of their engaging surfaces toward and away from one another, said engaging surfaces lying substantially intermediate said front and rear plates in said passage, resilient biasing means mounted exteriorly of said chamber and passage on said rear plate and cooperating with said mounting means for at least one of said pressure-applying members for urging said member toward the other member, and manually operable means mounted exteriorly of said chamber and passage on said rear plate for urging said pressure-applying member, in opposition to said biasing means, away from said other member to permit unrestricted movement of said film unit between said members.

5. Photographic apparatus according to claim 4 wherein the front and rear plates are adapted to be releasably engaged by film holder means of a camera located substantially at the focal plane of said camera whereby the apparatus may serve as a camera attachment.

6. Photographic apparatus according to claim 4 wherein the pressure-applying members are in the form of a pair of pressure rolls mounted for rotation on said mounting means and extending transversely of the front and rear plates, across said passage.

7. Photographic apparatus according to claim 6 wherein the pressure rolls are partially recessed in elongated apertures formed in said front and rear plates and extending transversely across said passage.

8. Photographic apparatus for exposing and processing a photographic film unit including a photosensitive element, an image-receiving element and a container releasably containing a processing liquid for forming an image with said image-receiving element by a diffusion transfer reversal process, said apparatus comprising a substantially flat front plate having an aperture of given contour formed therein for admitting actinic radiation to said photosensitive element, a substantially flat rear plate, spacer means located between the outer marginal areas of said front and rear plates, said front and rear plates and said spacer means being mutually attached to provide a shallow chamber therebetween for positioning said film unit so that said photosensitive element is aligned with said aperture for exposure to said radiation and providing a passage adjacent one end of said chamber for inserting and withdrawing said film unit and individual components thereof, a pair of pressure-applying members partially located within said passage for compressing said film unit during its withdrawal from said chamber to provide the release and spreading of said processing liquid, fixed bracket means for mounting one of said pressure-applying members, translationally movable bracket means for mounting the second of said pressure-applying members for movement toward and away from the first-named member, each of said bracket means extending angularly with respect to the principal flat surfaces of said plates, the engaging surfaces of said pressure-applying members lying substantially intermediate said front and rear plates in said passage, biasing means bearing against rod means interconnecting elements of said movable bracket means and urging said second pressure-applying member toward the first-named pressure-applying member, and manually operable means mounted exteriorly of said chamber and passage on one of said plates for cooperating with said interconnecting rod means and thereby urging said second pressure-applying member, in opposition to said biasing means, away from said first-named member to permit movement of said film unit between said members free from compression.

9. Photographic apparatus for incorporation with a camera for exposing and processing a photographic film unit including a photosensitive element, an image-receiving element and a container releasably containing a processing liquid for forming an image with said image-receiving element by a diffusion transfer reversal process, said apparatus comprising a front plate adapted to face the lens of said camera and having an aperture of given form and area for admitting the light of a photographic exposure to said photosensitive element, a rear plate, spacer means located between the outer marginal areas of said front and rear plates, said front and rear plates and spacer means being attached to one another to provide a chamber therebetween for positioning said film unit in correct relation to said aperture for exposure of said photosensitive element and providing a passage adjacent one end of said chamber for inserting and removing said film unit with respect to said chamber, a pair of pressure-applying members partially located within said passage for engaging said film unit therebetween during its withdrawal from said chamber to provide the release and spreading of said processing liquid, fixed bracket means for mounting one of said pressure-applying members, movable bracket means for mounting the second of said pressure-applying members for movement toward and away from the first-named member, said bracket means extending at a given angle with respect to the principal flat surfaces of said plates and the engaging surfaces of said pressure-applying members lying substantially intermediate said front and rear plates in said passage, resilient biasing means mounted exteriorly of said chamber and passage on one of said plates and cooperating with said movable bracket means for urging said second pressure-applying member toward the first-named member, and manually operable adjusting means mounted exteriorly of said chamber and passage on one of said plates for cooperating with portions of said movable bracket means also located exteriorly of said chamber to urge said second pressure-applying member, in opposition to said biasing means, away from said first-named member to permit unrestricted movement of said film unit between said members.

10. Photographic apparatus according to claim 9 wherein said movable bracket means comprises a pair of transversely spaced, angularly disposed elements slidably mounted for linear movement in slots which extend through the front and rear plates at each side of the passage.

11. Photographic apparatus according to claim 9 wherein the pressure-applying members are in the form of a pair of pressure rolls mounted for rotation in bearings of said bracket means and extending transversely of the front and rear plates, across said passage.

12. Photographic apparatus according to claim 11 wherein the pressure rolls are partially recessed in elongated apertures formed in said front and rear plates and extending across said passage.

13. Photographic apparatus according to claim 11 wherein is additionally included detent means for releasably holding the film unit in the chamber.

14. Photographic apparatus according to claim 11 wherein extremities of the pair of movable bracket means protrude through said slots exteriorly of the rear plate and are interconnected by a rigid rod which is adapted to move with said bracket means, said resilient biasing means being in the form of a flat spring bearing, respectively, against said rear plate and said interconnecting rod, and said manually operable means being in the form of a cam, bearing against said interconnecting rod and having an actuating lever.

References Cited in the file of this patent
UNITED STATES PATENTS

| | | |
|---|---|---|
| 2,451,820 | Garrett | Oct. 19, 1948 |
| 2,455,125 | Land | Nov. 30, 1948 |
| 2,455,126 | Land | Nov. 30, 1948 |
| 2,538,270 | Pratt | Jan. 16, 1951 |
| 2,689,306 | Land | Sept. 14, 1954 |
| 2,692,540 | Bing et al. | Oct. 26, 1954 |

UNITED STATES PATENT OFFICE
CERTIFICATE OF CORRECTION

Patent No. 2,854,908  
October 7, 1958

Vaito K. Eloranta

It is hereby certified that error appears in the printed specification of the above numbered patent requiring correction and that the said Letters Patent should read as corrected below.

Column 4, line 58, for "do no extend" read -- do not extend --; column 7, line 56, for "pressure-supplying members" read -- pressure-applying members --; line 68, for "memebr" read -- member --.

Signed and sealed this 25th day of April 1961.

(SEAL)  
Attest:

ERNEST W. SWIDER  
Attesting Officer

DAVID L. LADD  
Commissioner of Patents